US012346403B2

(12) United States Patent
Collier

(10) Patent No.: US 12,346,403 B2
(45) Date of Patent: Jul. 1, 2025

(54) DISTRIBUTING MATRIX MULTIPLICATION PROCESSING AMONG PROCESSING NODES

(71) Applicant: Hewlett Packard Enterprise Development LP, Spring, TX (US)

(72) Inventor: Aaron M. Collier, Bloomington, MN (US)

(73) Assignee: Hewlett Packard Enterprise Development LP, Spring, TX (US)

(*) Notice: Subject to any disclaimer, the term of this patent is extended or adjusted under 35 U.S.C. 154(b) by 0 days.

(21) Appl. No.: 18/734,123

(22) Filed: Jun. 5, 2024

(65) Prior Publication Data
US 2024/0320300 A1 Sep. 26, 2024

Related U.S. Application Data

(62) Division of application No. 18/189,625, filed on Mar. 24, 2023, now Pat. No. 12,061,666, which is a division of application No. 16/886,189, filed on May 28, 2020, now Pat. No. 11,640,443.

(51) Int. Cl.
| | |
|---|---|
| *G06F 17/16* | (2006.01) |
| *G06F 9/50* | (2006.01) |
| *G06F 9/54* | (2006.01) |

(52) U.S. Cl.
CPC ............ *G06F 17/16* (2013.01); *G06F 9/5066* (2013.01); *G06F 9/544* (2013.01)

(58) Field of Classification Search
CPC ..... G06F 7/57; G06F 8/41; G06F 9/45; G06F 9/50; G06F 9/54; G06F 7/544; G06F 7/5066; G06F 13/16; G06F 17/15; G06F 17/16; G06N 3/04; G06N 3/08; G06N 20/00; G11C 8/00; G11C 16/10
USPC .......... 707/737; 708/203, 250, 607; 712/221
See application file for complete search history.

(56) References Cited

U.S. PATENT DOCUMENTS

| | | | |
|---|---|---|---|
| 9,836,434 B2 | 12/2017 | Lvov et al. | |
| 10,061,748 B2 | 8/2018 | Kernert et al. | |
| 10,073,815 B2 | 9/2018 | Zhou | |
| 10,354,733 B1 | 7/2019 | Zejda et al. | |
| 10,417,304 B2 | 9/2019 | Serrano et al. | |
| 11,640,443 B2* | 5/2023 | Collier | G06F 17/16 |
| | | | 708/607 |

(Continued)

OTHER PUBLICATIONS

Martin Winter et al., "Adaptive Sparse Matrix-Matrix Multiplication on the GPU," Feb. 16, 2019, pp. 68-81, ACM.

(Continued)

*Primary Examiner* — Shawkat M Ali
(74) *Attorney, Agent, or Firm* — Yao Legal Services, Inc.

(57) ABSTRACT

Based on a predetermined number of available processor sockets, a plurality of candidate matrix decompositions are identified, which correspond to a multiplication of matrices. Based on a first comparative relationship of a variation of first sizes of the plurality of candidate matrix decompositions along a first dimension and a second comparative relationship of a variation of second sizes of the plurality of candidate matrix decomposition sizes along a second dimension, a given candidate matrix decomposition is selected. Processing of the multiplication among the processor sockets is distributed based on the given candidate matrix decomposition.

15 Claims, 12 Drawing Sheets

(56) References Cited

U.S. PATENT DOCUMENTS

| | | |
|---|---|---|
| 12,061,666 B2 * | 8/2024 | Collier .................... G06F 9/544 |
| 2020/0301857 A1 | 9/2020 | Marks et al. |
| 2021/0048991 A1 | 2/2021 | Tanner |
| 2022/0138895 A1 | 5/2022 | Raganathan et al. |
| 2023/0014565 A1 * | 1/2023 | Ray ................... G06F 16/24569 |

OTHER PUBLICATIONS

Mathias Parger et al., "spECK: Accelerating GPU Sparse Matrix-Matrix Multiplication Through Lightweight Analysis," Feb. 19, 2020, pp. 362-375, ACM.

Probir Roy et al., "NUMA-Gaffe: NUMA-Aware Deep Learning Neural Networks," Jun. 2018, pp. 1-26, ACM.

\* cited by examiner

DISTRIBUTING MATRIX MULTIPLICATION PROCESSING AMONG PROCESSING NODES

CROSS-REFERENCE TO RELATED APPLICATIONS

This application is a divisional application of and claims priority to U.S. application Ser. No. 18/189,625, filed on Mar. 24, 2023 which is a divisional application and claims priority to U.S. application Ser. No. 16/886,189, filed May 28, 2020, the contents of which are hereby incorporated by reference in their entireties.

BACKGROUND

A given computer system may contain a specialized math library that provides programs to support arithmetic operations in a wide variety of engineering, data mining, numeric processing, data analytics and machine learning applications. One such program may implement a version of a generalized matrix-matrix multiplication (GEMM) algorithm for purposes of performing matrix-matrix multiplication. For some applications, the matrices involved with the matrix-matrix multiplications may be relatively large (e.g., a given matrix may have thousands or hundreds of thousands of rows and columns, if not more), resulting in a relatively large number of floating point multiplication operations for each matrix-matrix multiplication.

DETAILED DESCRIPTION

Figure 1:
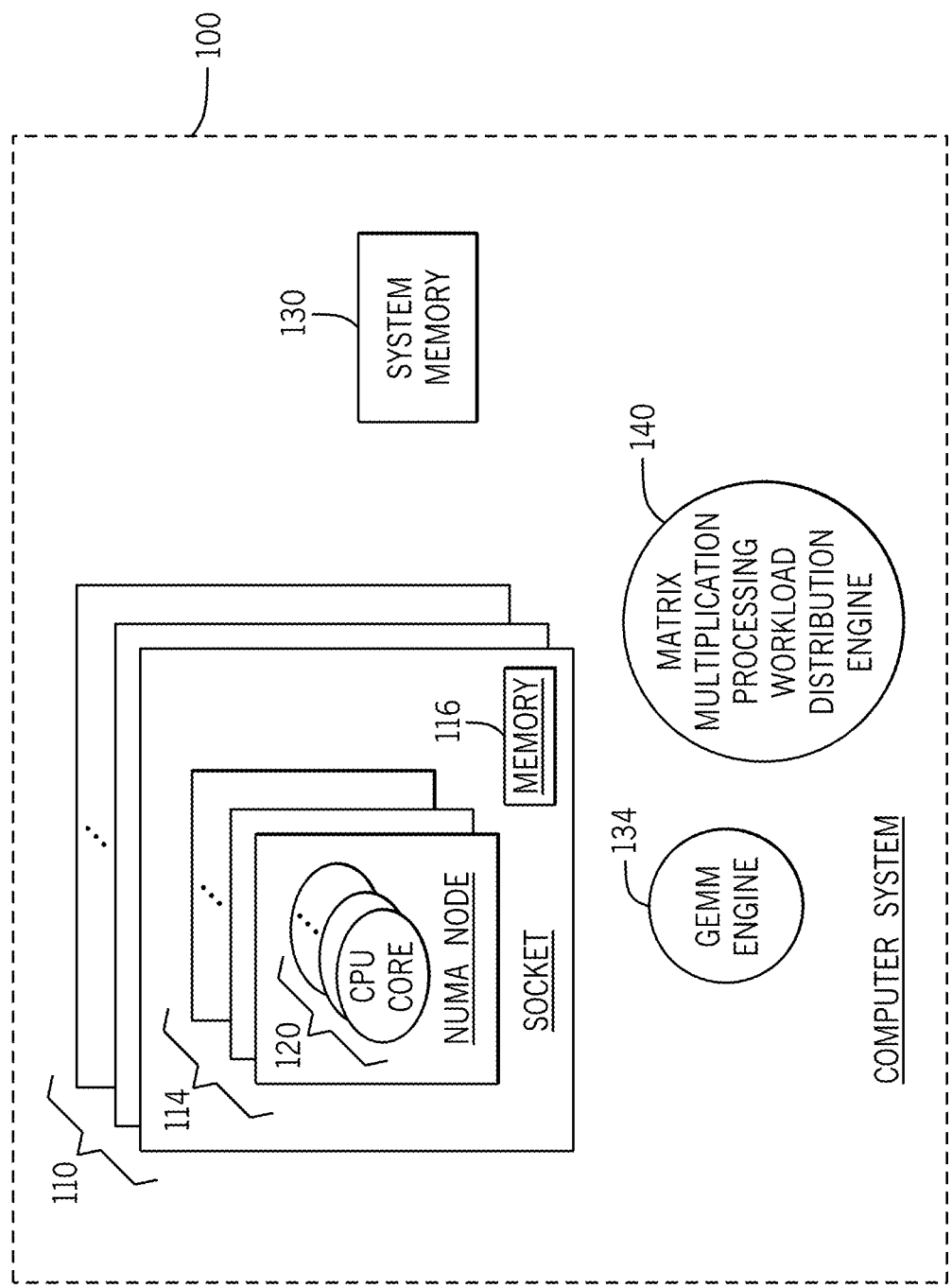
FIG. 1 is a schematic diagram of a computer system having a matrix multiplication processing workload distribution engine according to an example implementation.

The multiplication of two matrices (called "matrix-matrix multiplication" or "matrix multiplication" herein) may be performed in a computer system that has a non-uniform memory access (NUMA) architecture. In general, a NUMA architecture recognizes that processing nodes have faster access times to local memories than to non-local memory. Accordingly, in a NUMA architecture, processing performance may be optimized by the processing nodes, or NUMA nodes, performing most of their computations using local memory accesses.

As an example, a computer system that has multiple, multicore central processing unit (CPU) semiconductor packages (or "chips") may employ a NUMA architecture. As a more specific example, each CPU semiconductor package, or "socket" (also called a "processor socket" herein"), may contain multiple CPU processing cores that have access to a local on-chip memory. A number of processing cores on a given CPU semiconductor package may form a corresponding NUMA node (also called a "processing node" herein); and there may be multiple NUMA nodes per socket.

For matrix-matrix computations, the computer system may employ a generalized matrix-matrix multiplication (GEMM) algorithm that relies on different processing threads (on corresponding NUMA nodes and sockets) for performing different parts of the multiplication. Matrix-matrix multiplication may involve multiplying considerably large matrices, which contain thousands, if not hundreds of thousands (if not more) of rows and columns. For purposes of accommodating such computationally extensive operations, matrix partitioning may be used to distribute the processing workload among the processing threads of the computer system.

In accordance with example implementations that are described herein, the matrices that are involved in a matrix-matrix multiplication are partitioned in a way to divide up the processing workload of the matrix-matrix multiplication for better performance. More specifically, assume the matrix multiplication involves multiplying input matrix A by input matrix B to derive output matrix C. In accordance with example implementations, the first step, or phase, in the workload distribution involves determining how to distribute the matrix-matrix multiplication processing workload among the available sockets of the computer system. The first phase involves considering different ways in which matrices involved in the matrix-matrix multiplication may be partitioned, with each way being considered a potential, or candidate, decomposition of matrices (also called a "candidate matrix decomposition" herein). The candidate matrix decompositions correspond to different workload distributions among the sockets. In accordance with example implementations, the candidate matrix decomposition that results in the highest processing performance (based on conditions, or metrics, that are described herein) is selected, which results in a corresponding workload distribution among the sockets.

As an example, for two available sockets, the output matrix C may be subdivided, or partitioned, in one of two ways: 1. the output matrix C may be vertically partitioned into two partitions (i.e., all of the columns in each partition are left intact); or 2. the output matrix C may be horizontally partitioned into two partitions (i.e., all of the rows in each partition are left intact). The partitioning of the output matrix C deterministically results in a specific partitioning of the input matrix B, such that each way of partitioning the output matrix C results in a particular matrix decomposition (i.e., a candidate matrix decomposition), i.e., a particular way in which the input matrix B and the output matrix C are partitioned. As described herein, in accordance with example implementations, a fitness function is evaluated to determine a processing cost of distributing the workload among the sockets according to each candidate matrix decomposition, so that the corresponding workload distribution for the sockets may be selected that has the lowest processing cost.

In accordance with example implementations, after determining how to distribute the processing workload among the sockets, the second step, or phase, is to determine how to distribute the workload among the NUMA nodes of each socket. In accordance with example implementations, this phase involves considering further ways to partition the selected candidate matrix decomposition, resulting in candidate matrix sub-decompositions. Each candidate matrix sub-decomposition corresponds to a different workload distribution for the NUMA nodes; and as described herein, in accordance with example implementations, a fitness function is evaluated to determine a processing cost of distributing the workload among the NUMA nodes according to each candidate matrix sub-decomposition, so that the corresponding workload distribution for the NUMA nodes may be selected that has the lowest processing cost.

In accordance with example implementations, after determining how to distribute the processing workload among the sockets, the next step, or phase, is to determine how to distribute the processing workload among processing threads. As further described herein, in accordance with example implementations, this phase may involve evaluating candidate thread decompositions and selecting the candidate thread decomposition that has the lowest processing cost according to a fitness function.

Referring to FIG. 1, as a more specific example, in accordance with some implementations, a NUMA architecture-based computer system 100 includes processor sockets 110, NUMA nodes 114, and processing threads. More specifically, in accordance with some implementations, the computer system 100 may include multiple processor sockets 110, where, in this context, a "socket" refers to a CPU semiconductor package (or "chip"). In this context, a "semiconductor package" refers to a casing, or encapsulation, which contains one or multiple integrated circuits. The integrated circuit(s) of the semiconductor package may be disposed on one or multiple die; and the semiconductor package may contain leads (also called "contacts," "external contacts," "terminals," "external terminals," and so forth), which allow signals, voltages, currents, and so forth to be communicated between the integrated circuit(s) of the semiconductor package and one or multiple components outside of the semiconductor package. The semiconductor package may take on one of numerous forms, such as a through-hole package, a surface mount package, a chip carrier package, a pin grid array package, a flat package, a small outline package, a chip-scale package, a ball grid array package, and so forth. The socket 110, or CPU semiconductor package, contains one or multiple CPU cores 120 (also called "processing cores" herein), as well as additional circuits, such as caches, interconnects, and a local memory 116.

In accordance with example implementations, each socket 110 may include one or multiple NUMA nodes 114 (also called "processing nodes" herein); and each NUMA node 114, in turn, may be formed from one or multiple CPU processing cores 120 of a given socket 110. In accordance with an example implementation, the computer system 100 may have two sockets 110; and each socket 110 may have sixty-four CPU cores 120. Moreover, in accordance with example implementations, each NUMA node 114 may be formed from sixteen CPU cores 120 (i.e., there are four NUMA nodes 114 per socket 110). NUMA architectures having more or fewer than two sockets 110, more than or less than sixteen CPU cores 120 per NUMA node 114, and more than or less than sixty-four CPU cores 120 per socket 110 are contemplated and may be used to perform matrix-matrix multiplication, in accordance with other example implementations.

In accordance with example implementation, the CPU cores 120 execute units of machine executable instructions, called "threads" (or "processing threads") herein. In general, a given CPU core 120 may execute a processing thread in parallel with other CPU cores 120 that are executing other processing threads. The processing threads may execute independently of each other, may execute in a dependent fashion on one or multiple other processing threads, and/or may execute in a fashion that is independent in parts and dependent on other threads in other parts. For example, in accordance with some implementations, a given processing thread may execute independently until the processing thread reaches a synchronization barrier of the thread, which pauses thread execution until a condition (e.g., an input, an output, a thread state, and so forth) dependent on one or multiple other processing threads occur.

The computer system 100 may take on many different forms, in accordance with many possible implementations. In general, the computer system 100 may be a rack-based computer system; a rack-based module, or cartridge; a server; a client; a desktop computer; a tablet computer; a wearable computer; a smartphone; a portable computer; and so forth.

In accordance with example implementations, the computer system 100 may perform processing to compute the product of two matrixes, i.e., the computer system 100 may perform matrix-matrix multiplication (also called "matrix multiplication" herein). As examples, the matrix-matrix multiplication may be used for a number of different applications, such as machine learning, computer vision, forecasting, data mining, data analytics, classification, or other applications. As depicted in FIG. 1, in accordance with some implementations, for purposes of performing the matrix-matrix multiplication, the computer system 100 includes a generalized matrix-matrix multiplication (GEMM) engine 134. The GEMM engine 134 is formed by the CPU cores 120 executing machine executable instructions, or software (e.g., software that is part of a math library), to compute a matrix-matrix multiplication using a GEMM algorithm. As part of this execution, the computations are performed in a parallel fashion by the processing threads. Although, in general, the matrices involved in a matrix-matrix multiplication may be partitioned, so that different processing threads may be assigned different parts of the processing workload of the matrix-matrix multiplication, how the processing workload is assigned may significantly affect the computer system's performance (e.g., a performance as measured in gigaflops (GFLOPS), or the number of billions of floating point operations per second) in computing the matrix-matrix multiplication.

In accordance with example implementations that are described herein, the computer system 100 contains a runtime matrix multiplication processing workload distribution engine 140 to determine a processing thread assignment that enhances, if not optimizes, the computation of a matrix-matrix multiplication. In accordance with example implementations, the engine 140 may be a software-based engine that is formed by one or multiple CPU cores 120 of the computer system 100 executing machine executable instructions (or "software"). Although, as depicted in FIG. 1, the engine 140 may be part of a computer system that also executes a GEMM algorithm to perform matrix-matrix multiplication, in accordance with further implementations, the engine 140 may be part of a computer system other than the computer system 100. For example, in accordance with further example implementations, the engine 140 may be part of a server that receives data from the computer system 100 representing dimensions of the matrices to be multiplied and the architecture (e.g., number of sockets 110, NUMA nodes 114 and CPU cores 120) available for the matrix-matrix multiplication; and the engine 140 may provide data to the computer system 100 representing a workload distribution for processing the matrix-matrix multiplication.

Figure 2:
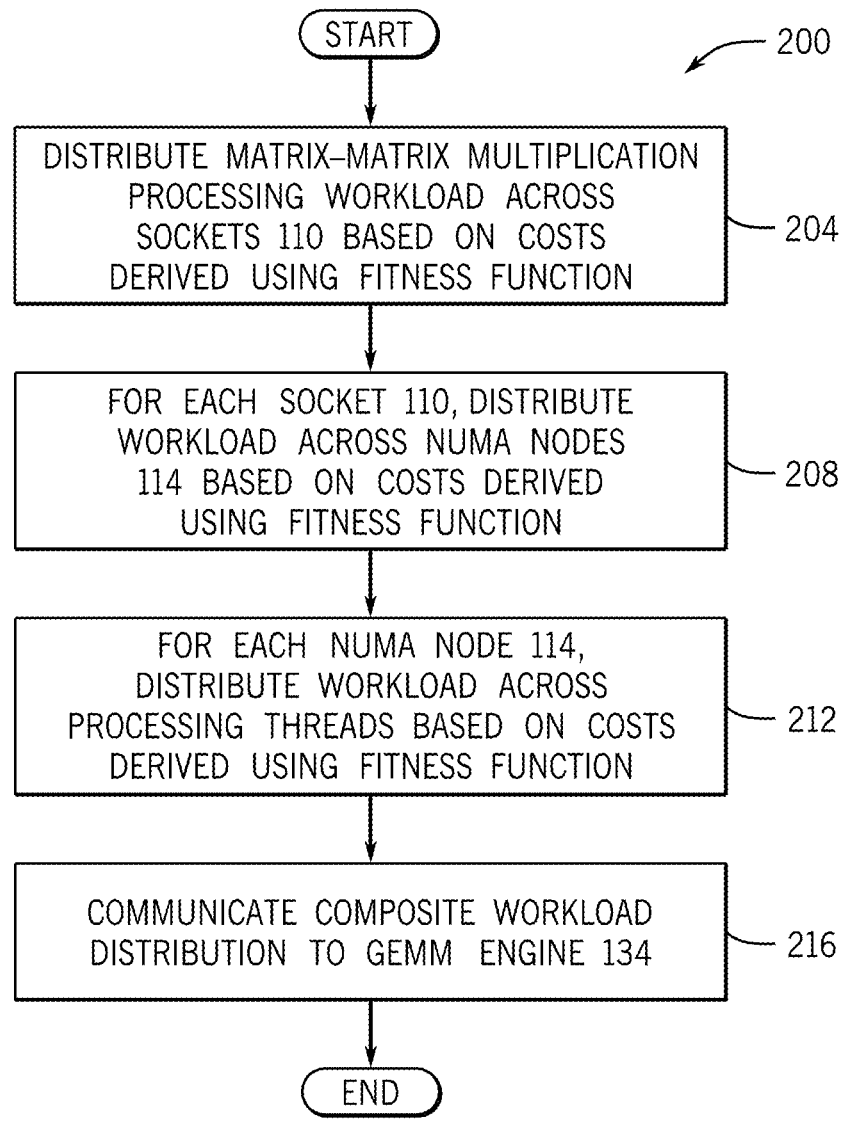
FIG. 2 is a flow diagram depicting a process used by the matrix multiplication processing workload distribution engine of FIG. 1 to distribute a matrix processing workload according to an example implementation.

In general, regardless of its location, in accordance with example implementations, the engine 140 distributes the processing workload for a matrix-matrix multiplication in three steps, or phases. Referring to FIG. 2 in conjunction with FIG. 1, in the first phase, the engine 140 distributes (block 204) the matrix-matrix workload across the sockets 110 that are available to work on the matrix-matrix multiplication. In this context, "distributes" refers to the engine 140 assigning parts of the total parts of the total processing workload to the sockets 110 so that collectively, the sockets 110 determine the product. The number of "available" sockets 110 may be equal to the total number of sockets 110 of the computer system 100 or may be a number less than then total number of sockets. Unless clarified otherwise, in the following discussion, references to "sockets," "NUMA nodes," and "processing threads" refers to available sockets, NUMA nodes and processing threads, respectively.

As further described herein, in accordance with example implementations, for the first phase, the engine 140 evaluates candidate distributions for the sockets 110 based on a cost, or fitness, function. More specifically, in accordance with example implementations, the engine 140 determines a set of candidate processor socket workload distributions, determines a cost for each of these candidate distributions, and selects the candidate distribution based on the costs. In accordance with example implementations, the "cost" correlates to a processing cost, or burden, for the candidate distribution, such that the lowest cost candidate distribution has lowest (or at least is predicted to have the lowest) associate processing cost. As depicted in block 204, in accordance with example implementations, the engine 140 therefore distributes the matrix-matrix multiplication workload across the sockets 110 based on costs that are derived using a fitness function.

In the second phase of the workload distribution, the engine 140 distributes (block 208) the processing workload that has been assigned to each socket 110 among the NUMA nodes 114 of the socket 110. More specifically, in accordance with example implementations, the engine 140 determines a set of candidate NUMA node workload distributions, determines a cost for each of these candidate distributions based on a fitness function, and selects the candidate distribution based on the costs. As depicted in block 208, in accordance with example implementations, the engine 140 therefore distributes the matrix-matrix multiplication workload across the NUMA nodes 114 of each socket 110 based on costs that are derived using a fitness function.

In the third phase of the workload distribution, the engine 140 distributes (block 212) the processing workload that has been assigned to each NUMA node 114 across the processing threads of the NUMA node 114. More specifically, in accordance with example implementations, for each NUMA node 114, the engine 140 determines a set of candidate processing thread decompositions, evaluates a cost for each thread decomposition, and selected the candidate thread distribution based on the costs. As depicted in block 212, in accordance with example implementations, the engine 140 therefore distributes the matrix-matrix multiplication workload across the processing threads of each NUMA node 114 based on costs that are derived using a fitness function.

At the end of the three phases, the engine 140 communicates (block 216) the composite workload distribution to the GEMM engine 134, which then assigns the processing tasks based on this workload distribution and performs the matrix-matrix multiplication. In accordance with an example implementation, the communication of the composite workload distribution to the GEMM engine 134 may include identifiers that, for each processing thread, identify the processing thread (e.g. a processing thread identifier, NUMA node identifier and socket identifier) and identify the matrix partition(s) that are assigned to the processing thread. In other words, the workload distribution assignment for each processing thread corresponds to a set of multiplication operations and corresponding data sets to be processed by the processing thread.

Figure 3:
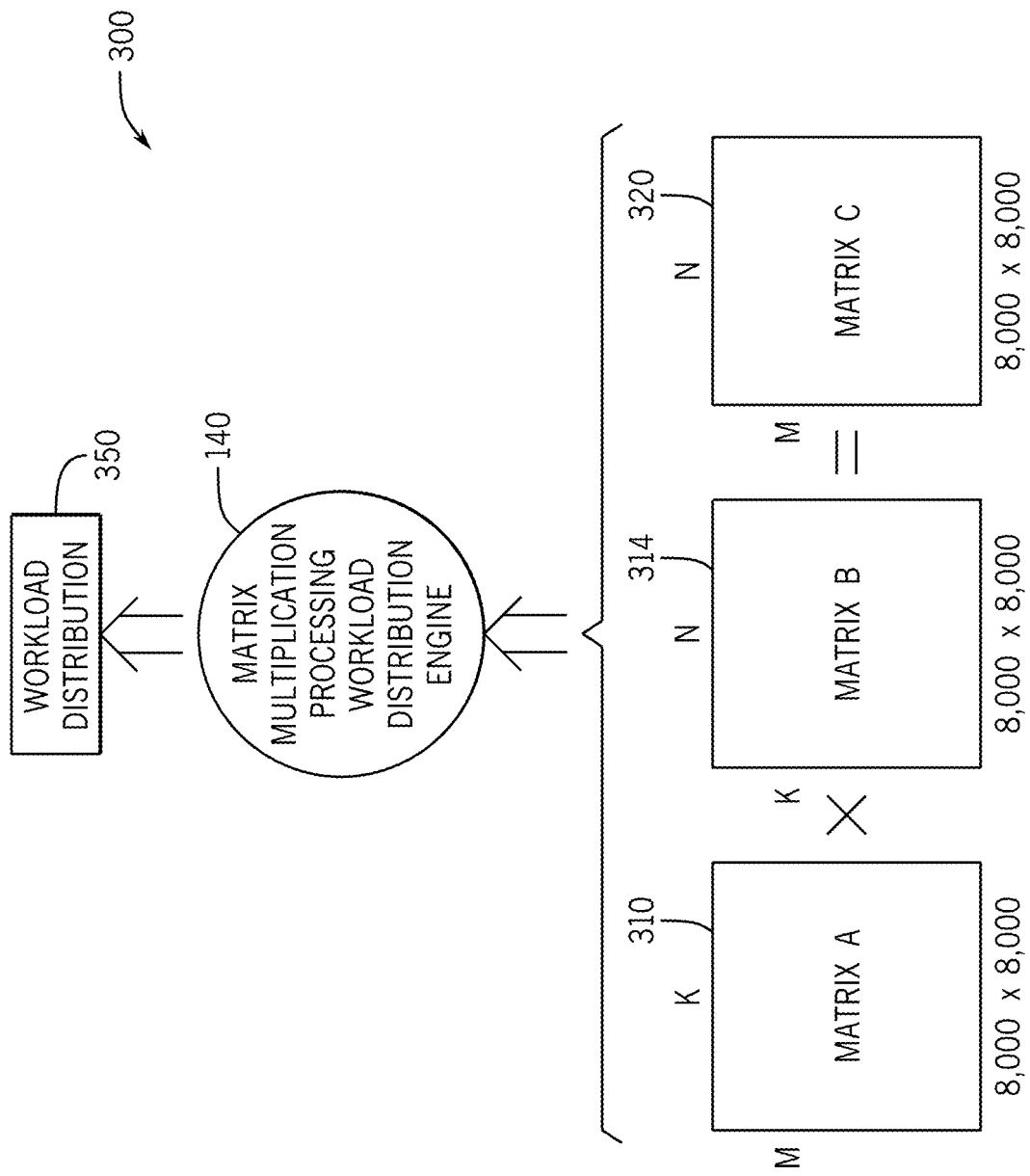
FIG. 3 is an illustration of a process to generate a processing workload distribution for an example multiplication of matrices according to an example implementation.

FIG. 3 is an illustration of a process 300 to determine a workload distribution 350 for a matrix-matrix multiplication involving the multiplication of an input matrix A 310 and an input matrix B to produce a multiplication product, matrix C. For the example of FIG. 3, the input matrix A 310 has a size K along a first dimension (e.g., a horizontal dimension that extends along the row), such as a number of columns, and a size M along a second dimension (e.g., a dimension that extends along the column), such as a number of rows. Moreover, as depicted in FIG. 3, the input matrix B 314 has N columns and K rows. Given the dimensions of the input matrix A 310 and the input matrix B 314, the output matrix C 320 correspondingly has N columns and M rows. For the specific example of FIG. 3, the input matrix A 310, the input matrix B 314 and the output matrix C 320 each have a two-dimensional (2-D) size of 8000×8000 (i.e., 8000 columns by 8000 rows). It is noted that the matrices of FIG. 3 are merely for purposes of example, as the matrices may have other 2-D sizes, and the input matrices may have different 2-D sizes relative to each other.

Figure 5A:
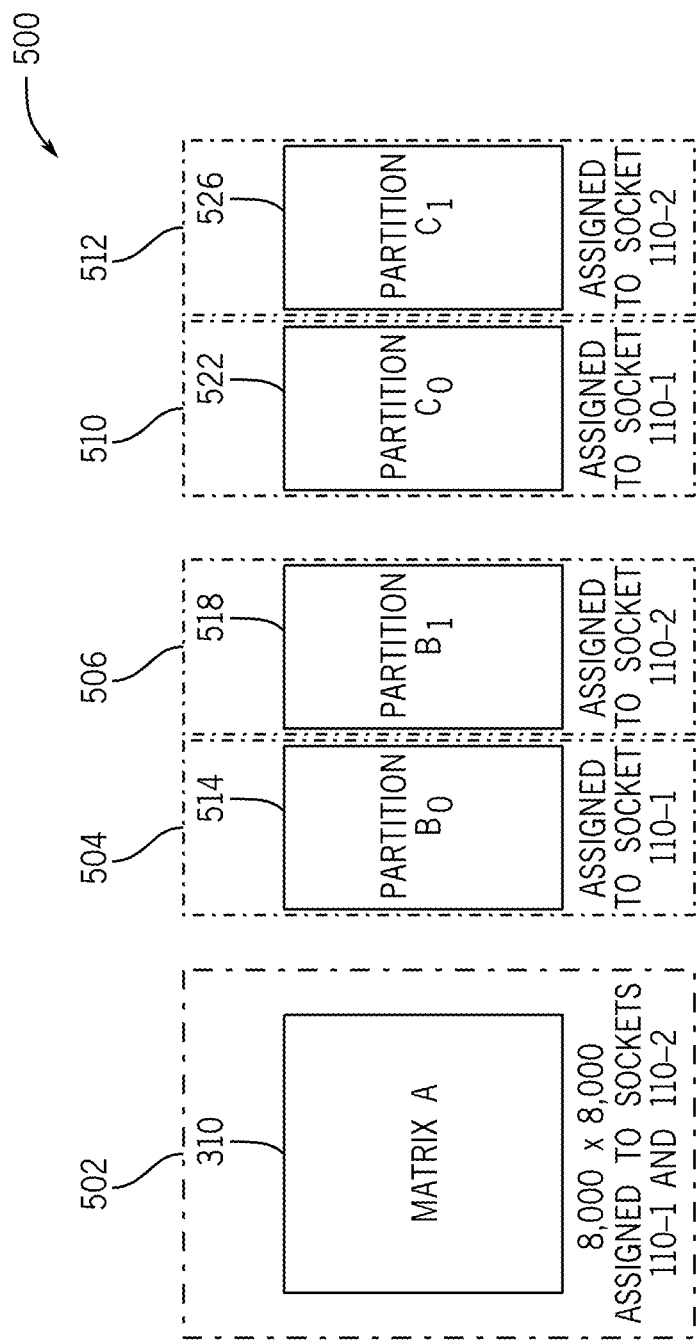
FIG. 5A is an illustration of a decomposition of matrices for the example matrix-matrix multiplication of FIG. 3 for purposes of distributing the processing workload across sockets according to an example implementation.
Figure 5B:
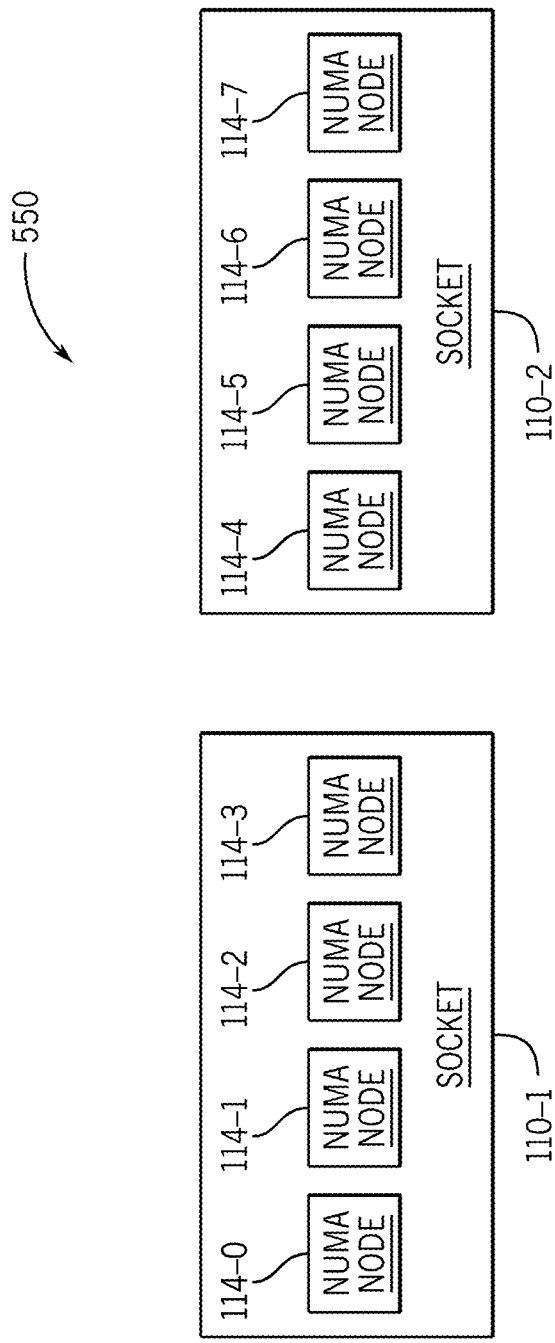
FIG. 5B is an illustration of available sockets and non-uniform memory access (NUMA) nodes for performing the matrix-matrix multiplication of FIG. 3 according to an example implementation.

For the following example, it is assumed that the computer system 100 has an available structure 550 for processing the matrix-matrix multiplication, which is illustrated in FIG. 5B. Referring to FIG. 5B, for this example, there are two sockets 110-1 and 110-2; the socket 110-1 has four NUMA nodes 114-0, 114-1, 114-2 and 114-3; and the socket 110-2 has four NUMA nodes 114-4, 114-5, 114-6 and 114-7. Moreover, for the example described herein, each NUMA node 114 has sixteen CPUs 120 (not depicted in FIG. 5B) and therefore, sixteen processing threads (not depicted in FIG. 5B).

Referring to FIG. 5A in conjunction with FIGS. 1 and 3, for purposes of distributing the matrix-matrix multiplication processing workload across the sockets 110, the engine 140 first determines the potential ways to partition the matrices that are involved in the matrix-matrix multiplication; and each way corresponds to a particular decomposition of matrices, called a "matrix decomposition" herein. More specifically, in accordance with example implementations, the engine 140 considers the potential ways to partition a given matrix associated with the matrix-matrix multiplication, and each of these ways, in turn, corresponding to a different candidate matrix decomposition. For example, in accordance with some implementations, the engine 140 determines each of the ways in which the output matrix C 320 based on the number of sockets 110. For this example, there are two ways (due to the two sockets 110) to partition the output matrix C 320: 1. partition the output matrix C 320 into two vertical partitions (called a "1×2" partitioning); or 2. partition the output matrix C 320 into two horizontal partitions (called a "2×1" partitioning).

FIG. 5A depicts the 1×2 partitioning of the output matrix C 320 into a 4000 column by 8000 row partition $C_0$ 522 and a 4000 column by 8000 row partition $C_1$ 526. This partitioning of the output matrix C 320 deterministically results in the 1×2 partitioning of the input matrix B 314 into a 4000 column by 8000 row partition $B_0$ 514 and a 4000 column by 8000 row partition $B_1$ 514. Moreover, the input matrix A 310 is accordingly not partitioned. The resulting set of partitions depicted in FIG. 5A is one matrix decomposition 500 out of two possible matrix decompositions, given the constraint that there are two sockets. In this manner, the 2×1 partitioning the output matrix C 320 deterministically results in the 2×1 partitioning of the input matrix B 314 to form another matrix decomposition. Both of these matrix decompositions, in turn, are candidate matrix decompositions, which, in accordance with example implementations, the engine 140 evaluates using a fitness function to determine which candidate matrix decomposition to select.

The selected candidate decomposition, in turn, determines the distribution of the matrix processing workload across the sockets 110. For example, the matrix decomposition 500 corresponds to partition $C_0$ 522 being assigned to socket 110-1 (as depicted by box 510), partition $C_1$ 526 being assigned to socket 110-2 (as depicted by box 512), partition $B_0$ 514 being assigned to socket 110-1 (as depicted by box 504), partition $B_1$ 518 being assigned to socket 110-1 (as depicted by box 506), and the input matrix A 310 being assigned to both sockets 110-1 and 110-2 (as depicted by box 502).

In accordance with some implementations, for purposes of selecting the particular candidate block size, the engine 140 applies a fitness function to determine an associated cost for each of the candidate decompositions; and the engine 140 selects the candidate matrix decomposition that has the lowest associated cost. More specifically, in accordance with some implementations, the fitness function calculates the cost in a way that guides, or steers, the cost such that the fitness function is biased to select a candidate matrix decomposition that has the smallest variation in partition block sizes in both dimensions. Moreover, in accordance with some implementations, the fitness function is biased to prefer vertical partitioning, which takes advantage of column centric processing.

More specifically, in accordance with an example implementation, for purposes of determining which candidate matrix decomposition to select, the engine 140 applies a fitness function that considers four metrics, or conditions: 1. a first condition that is the relative difference between the largest and the smallest block sizes in a vertical dimension (e.g., a dimension extending along the column); 2. a second condition, which is the relative difference between the largest and the smallest distributed block sizes in the horizontal dimension (e.g., a dimension extending along the row); a third condition, which is the ratio of maximum to minimum number of blocks in the vertical and horizontal dimensions; and a fourth condition that is "1" if the number of blocks in the horizontal dimension is equal or greater than the number of blocks in the vertical dimension and otherwise, "0." In accordance with some implementations, the engine 140 normalizes the values used to derive the conditions for the fitness function.

As a more specific example, the engine 140 may determine the cost of the candidate matrix decomposition 500 as follows. The first condition is "0" in that there is no difference between the largest and smallest distributed block sizes in the vertical dimension. For condition two, the relative difference between the largest and smallest distributed block sizes in the horizontal dimension is also 0, as there is no variance. Moreover, for condition three, the ratio of the maximum to minimum number of blocks in the horizontal and vertical dimensions is "1." For condition four, the corresponding value is "0," in that the number of blocks in the vertical dimension is greater than the number of blocks in the horizontal dimension. It is noted that, for this example, the cost for the candidate matrix decomposition based on the 2×1 partitioning of the output matrix C 320 has a higher associated cost. Therefore, as because the candidate matrix decomposition 500 has a lower cost, for this example, the engine 140 selects the candidate matrix decomposition 500 and distributes the workload across the sockets 110-1 and 110-2, according the distribution that is depicted in FIG. 5A.

Figure 4:
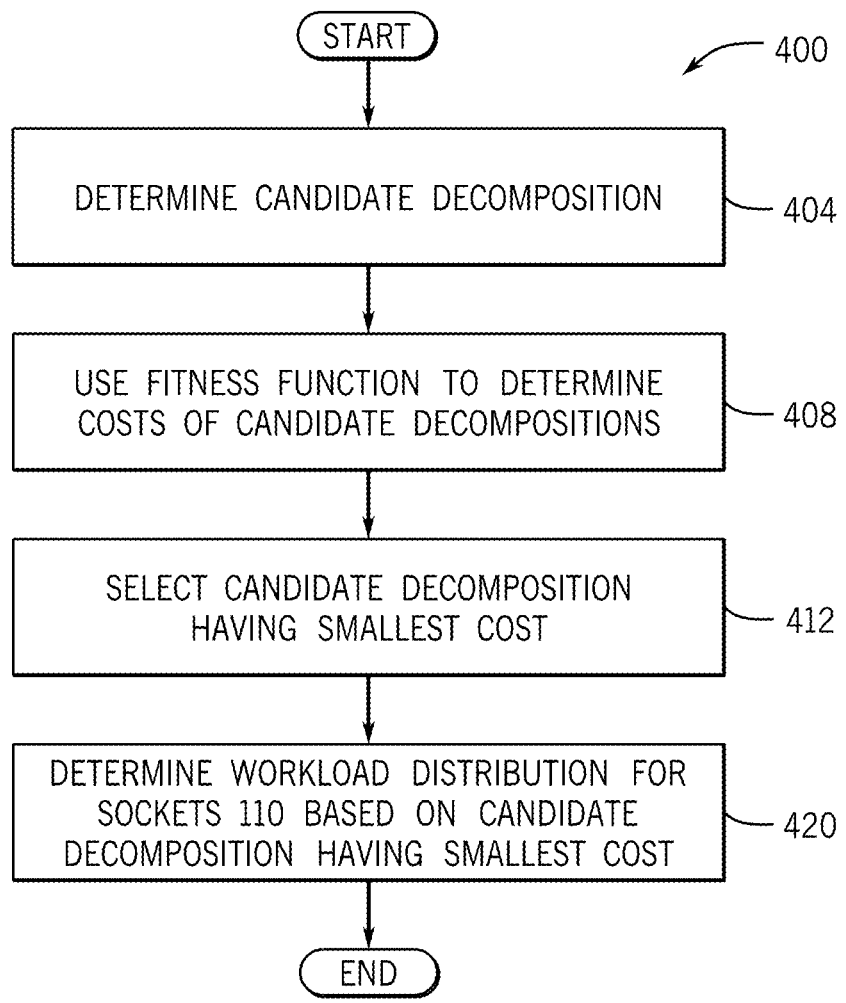
FIG. 4 is a flow diagram depicting a process to distribute a matrix-matrix multiplication processing workload across sockets according to an example implementation.

Thus, in accordance with example implementations, the engine 140 may perform a process 400 that is depicted in FIG. 4. Referring to FIG. 4 in conjunction with FIG. 1, pursuant to the process 400, for the first phase of the workload distribution across sockets 110, the engine 140 determines (block 404) candidate matrix decompositions and then uses (block 408) a fitness function to determine the costs of the candidate matrix decompositions. The engine 140 selects the candidate matrix decomposition that has the smallest associated cost, pursuant to block 412, and the engine 140 determines (block 420) the workload distribution for the sockets 110 based on the selected candidate matrix decomposition, pursuant to block 420.

Figure 7:
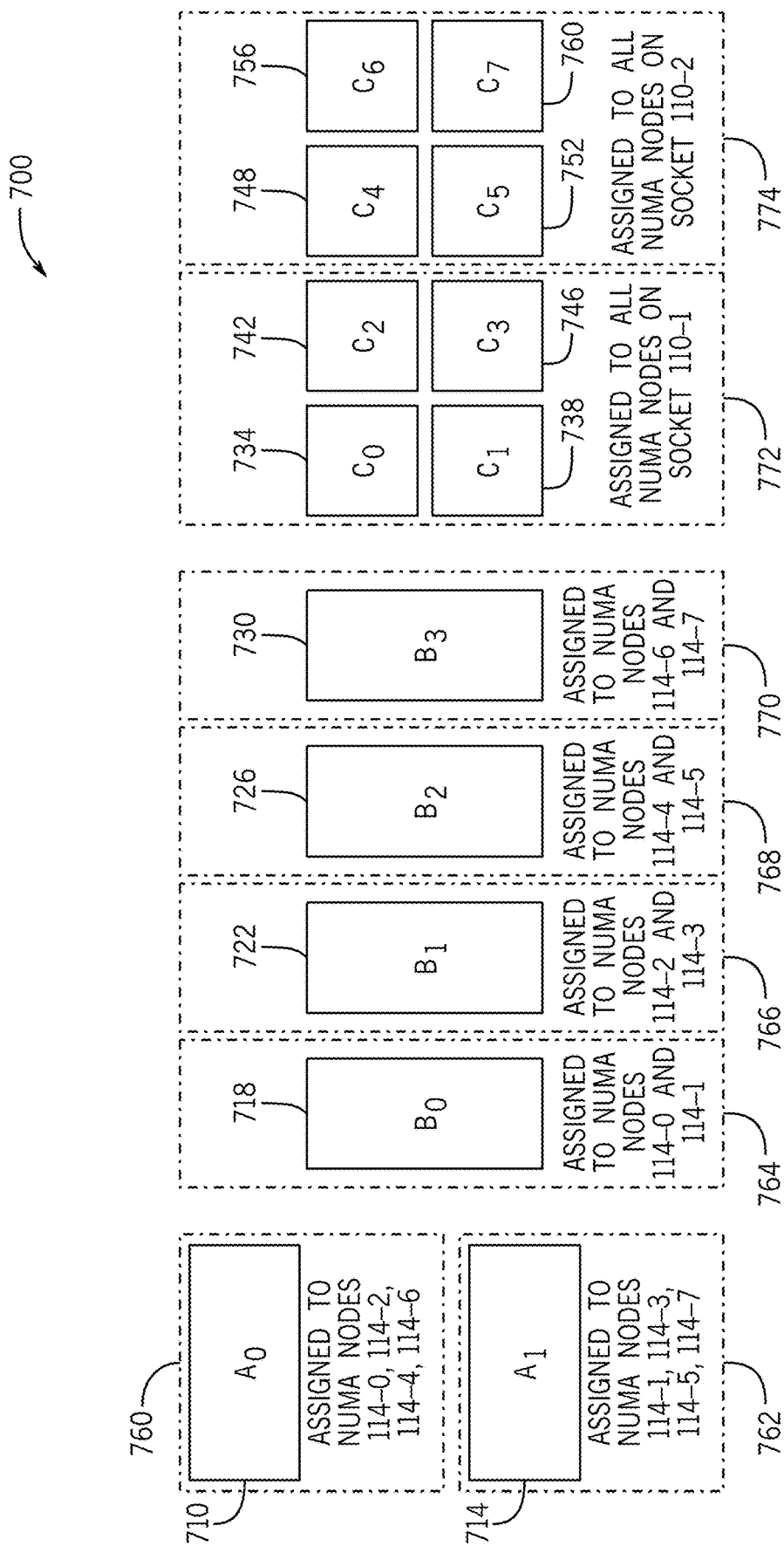
FIG. 7 is an illustration of the further partitioning of a matrix decomposition to derive a sub-decomposition of matrices according to an example implementation.

Next, in accordance with example implementations, for the second phase, the engine 140 determines a distribution of the matrix-matrix multiplication workload across the NUMA nodes 114. Referring to FIG. 7 in conjunction with FIGS. 5A and 1, the engine 140 determines the number of active NUMA nodes 114. The engine 140 then determines all possible divisors and evaluates a fitness function to determine the subblocking, or matrix sub-decompositions, of the selected candidate decomposition discussed above. Continuing the example above, this step may involve determining possible sub-decompositions of the decomposition 500 of FIG. 5. The matrix sub-decompositions involve a further sub-partitioning of the selected matrix decomposition and as such, involves further subdividing the partitions, or blocks, discussed above into sub-blocks. In accordance with example implementations, the engine 140 may use the first fitness function and the associated conditions that are discussed above.

More specifically, for the example decomposition 500 of FIG. 5, the engine 130 considers the number of decompositions based on the number of NUMA nodes 114 per socket 110. For the example that is set forth above, there are four NUMA nodes 114 per socket; and as such, there are three possible candidate sub-decompositions: a 1×4 candidate sub-decomposition; a 2×2 candidate sub-decomposition; and a 4×1 candidate sub-decomposition. Applying the fitness function described above the 2×2 candidate sub-decomposition has the lowest corresponding costs. As such, in accordance with example implementations, the engine 130 selects an example sub-decomposition 700 that is illustrated in FIG. 7. In other words, referring to FIG. 7 in conjunction with FIG. 5, the $C_0$ partition 522 is decomposed into a $C_0$ subpartition 734, a $C_1$ subpartition 738, a $C_2$ subpartition 742 and a $C_3$ subpartition 746; and the $C_1$ partition 526 is subdivided into a $C_4$ subpartition 748, a $C_5$ subpartition 752, a $C_6$ subpartition 756 and a $C_7$ subpartition 760. With the subpartitioning of the C matrix in this manner, the $B_0$ partition 514 is partitioned into a corresponding $B_0$ subpartition 718 and a $B_1$ subpartition 722; and the $B_1$ partition 518 is subdivided into the $B_2$ subpartition 726 and the $B_3$ subpartition 730.

Moreover, this also deterministically results in the partitioning of the A matrix 310 into an $A_0$ partition 710 and an $A_1$ partition 714. Thus, accordingly, as depicted by box 772, the $C_0$ subpartition 734, $C_1$ subpartition 738, $C_2$ subpartition 742 and the $C_3$ subpartition 746 are assigned to all four NUMA nodes 114 of the processor socket 110-1; and the $C_4$ subpartition 748, $C_5$ subpartition 752, $C_6$ subpartition 756 and $C_7$ subpartition 760 are assigned to all four NUMA nodes 114 of the processor socket 110-2. As depicted in box 764, two NUMA nodes 114-0 and 114-2 of the processor socket 110-1 process the $B_0$ subpartition 718; and the other two NUMA nodes 114-2 and 114-3 of the processor socket 110-1 process the $B_1$ subpartition 722. The two NUMA nodes 114 of the processor socket 110-2 process the two NUMA nodes 114-4 and 114-5 of the processor socket 110-2 process the $B_2$ subpartition 726; and the other two NUMA nodes 114-6 and 114-7 of the processor socket 110-2 process the $B_3$ subpartition 730.

There are node processing divisions for the $A_0$ subpartition 710 and the $A_1$ subpartition 714 for the processor sockets 110-1 and 110-2. More specifically, in accordance with example implementations, NUMA nodes 114-0, 114-2, 114-4 and 114-6 access the $A_0$ subpartition 710; and NUMA nodes 114-1, 114-3, 114-5 and 114-7 access the $A_1$ subpartition 714. With this information, in accordance with example implementations, the engine 140 assigns NUMA node masks for shared buffer allocations.

Figure 6:
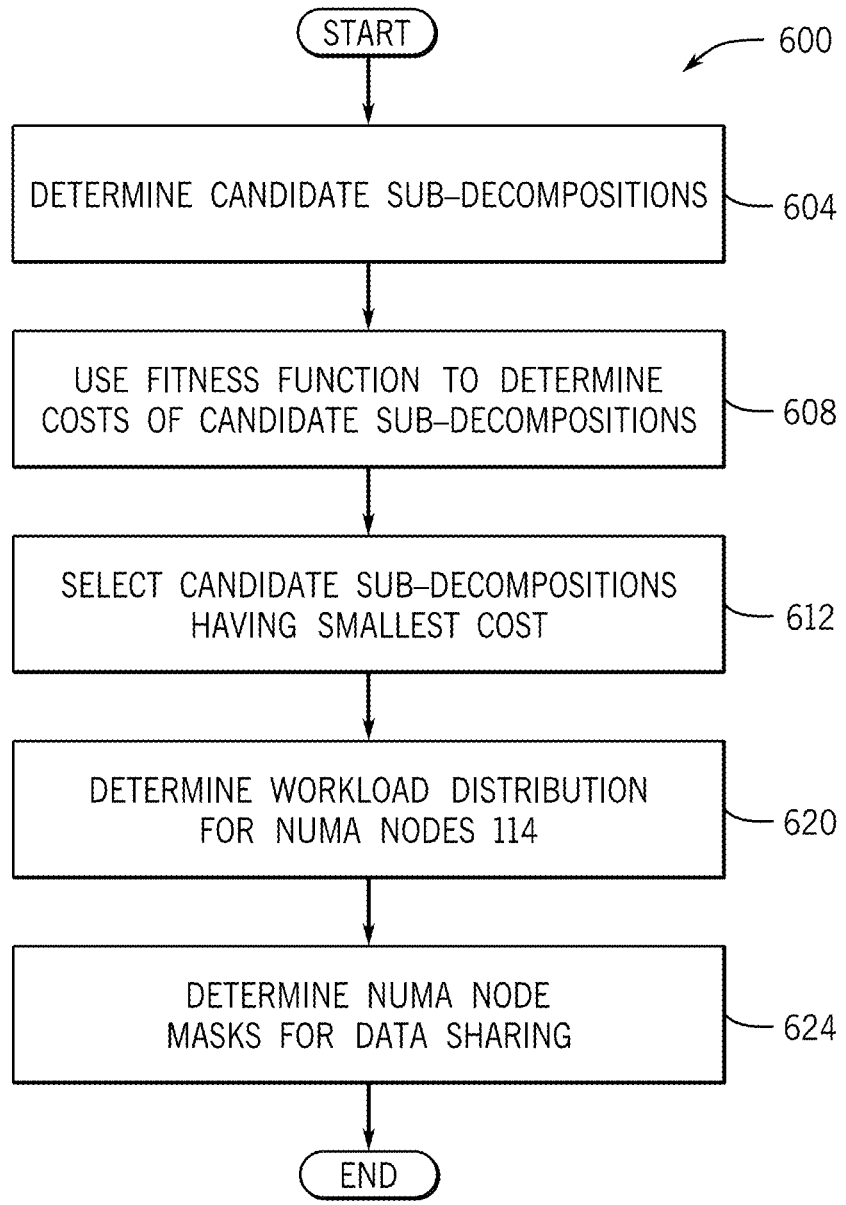
FIG. 6 is a flow diagram depicting a process to distribute a matrix-matrix multiplication processing workload across NUMA nodes according to an example implementation.

Referring to FIG. 6 in conjunction with FIG. 1, thus, in accordance with example implementations, pursuant to a process 600, the engine determines (block 604) candidate sub-decompositions and uses (block 608) a fitness function to determine the costs associated with the candidate sub-decompositions. Pursuant to block 612, the engine 130 selects the candidate sub-decomposition that has the smallest cost and, pursuant to block 616, determines the corresponding node masks for the selected candidate sub-decomposition. Pursuant to block 620, the engine 130 determines the workload distribution for the NUMA nodes 114 based on the selected candidate sub-decomposition.

After distributing the matrix-matrix multiplication workload according to the processor sockets 110 and NUMA nodes 114, the engine 140 then proceeds to phase three and distributes the workload across the processing threads. In accordance with some implementations, the number of threads per NUMA node 114 corresponds to the number of CPU cores 120 per NUMA node 114. For each NUMA node 114, the engine 140 determines a set of candidate thread decompositions. Each candidate thread decomposition is a mapping between each processing thread and the partition block or blocks to be processed by the processing thread. The engine 140 evaluates the candidate thread decompositions based on costs that are derived using a fitness function. In this manner, in accordance with example implementations, the engine 140 evaluates normalized values for different conditions, or metrics, and considers all devisors of the number of active threads for each NUMA node-sized unit. The resulting 2-D configuration of threads determines a layout of underlying thread groups that cooperate at different stages of the GEMM algorithm.

More specifically, in accordance with some implementations, for each NUMA node 114, the engine 140 evaluates a fitness function by summing together values corresponding conditions for each candidate thread decomposition, and the engine 140 selects the candidate thread decomposition that has the lowest corresponding cost. In accordance with example implementations, the conditions may include one, some of the following conditions, as well as other conditions. Condition 1 is the absolute difference between number of sub-blocks in the vertical horizontal dimension and the minimum of the number for all of the thread decompositions. This condition steers the selection of the thread decomposition to prefer an optimal cache block size. Condition 2 is the absolute difference between cache block sizes in the vertical and horizontal dimensions. Condition 3 is "0" if the number of threads in the horizontal dimension is an integer multiple of the number of CPU cores 120 per NUMA node 114, and is otherwise "1." Condition 4 is "0" if number of threads in the horizontal dimension is less than or equal to number of CPU cores 120 per NUMA node 114, and is otherwise "1." Condition 5 is the aggregate difference value computed based on the number of CPU cores 120 per last level cache (LLC). Condition 6 is the ratio of the maximum of processing threads in the vertical and horizontal dimensions to the minimum number of processing threads in the vertical and horizontal dimensions. Condition 7 is a normalized ceiling calculation of ratio of number of threads in the vertical dimension and maximum number of decomposable blocks of input matrix A available for shared packing. Condition 8 is a normalized ceiling calculation of a ratio of number of threads in the vertical dimension and the maximum number of decomposable blocks of the input matrix B available for shared packing. Condition 9 is the remainder of local size in the vertical dimension divided by the cache block size. Condition 10 is the difference between the optimal and selected cache block sizes for the vertical dimension. Condition 11 is a measure of efficiency of threaded distribution of input matrix B packing given selected cache block size in the horizontal dimension.

In accordance with example implementations, the engine 140 normalizes each condition value with respect to the largest value across all possible thread decompositions to provide weighted contributions, and then the engine 140 sums the values for each thread decomposition to compute a singular fitness value, or cost. In accordance with example implementations, the engine 130 selects the thread decomposition that has the lowest cost.

For the example set forth herein, the possible thread-level decompositions, assuming 16 cores per NUMA node 114, are 1×16, 2×8, 4×4, 8×2 and 16×1. Given the selection criteria, in accordance with example implementations, the engine 130 selects the 4×4 decomposition for each NUMA node 114 for both sockets 110-1 and 110-2, because all sub-blocks for each NUMA node 114 are equally sized and are so similarly constrained.

Figure 8:
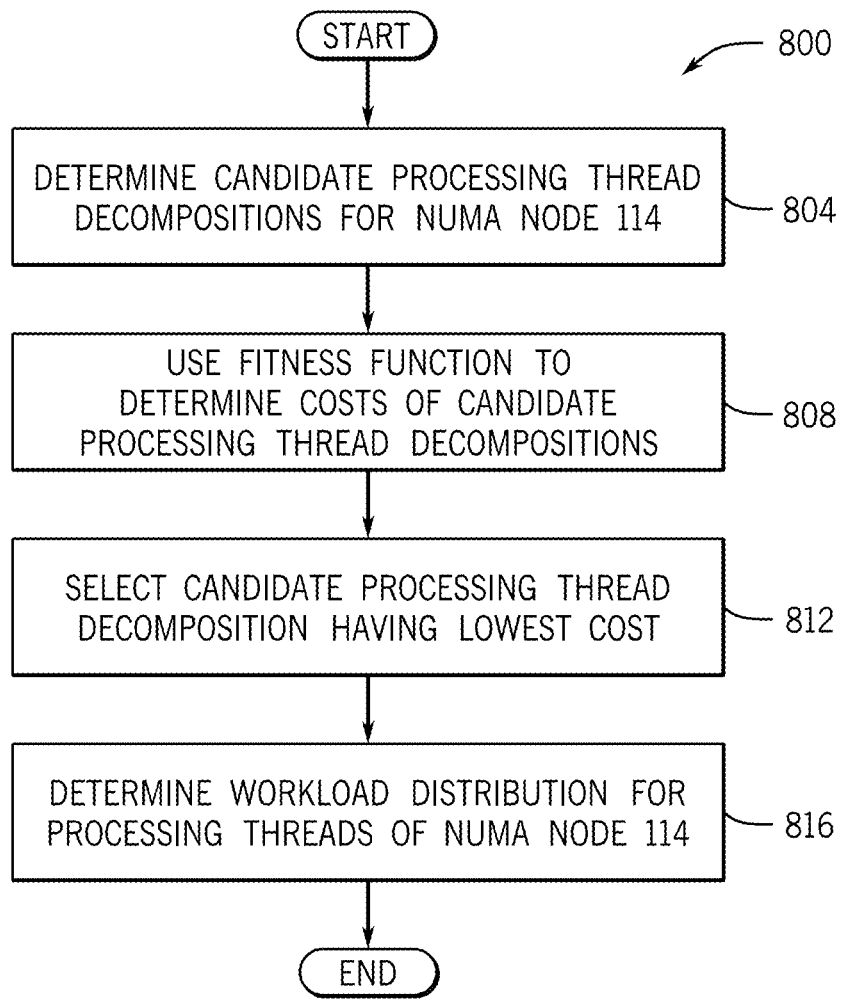
FIG. 8 is a flow diagram depicting a process to distribute a matrix-matrix processing workload across processing threads according to an example implementation.

Thus, referring to a process 800 that is depicted in FIG. 8, in accordance with example implementations, the engine 130 determines (block 804) candidate thread decompositions (block 804) and uses (block 808) a fitness function to determine costs of the candidate thread decompositions. Pursuant to block 812, the engine 130 selects the candidate thread decomposition having the lowest cost and then determines, pursuant to block 816, the workload distribution for the threads.

Referring back to FIG. 1, in accordance with example implementations, the GEMM engine 34 includes processing thread synchronization barriers. Moreover, the GEMM engine 134 uses shared data structures that are explicitly local to a given NUMA node 114, if possible, to help further improve data locality and reduce contention. In accordance with example implementations, the synchronization barriers may be a derived data type that is equal in size to a cache line to avoid false sharing. In accordance with example implementations, the processing threads within a NUMA node 114 proceed independently from other processing threads, except for limited intra-socket coordination that is used for buffering shared blocks of the input matrices A and B. The processing threads may adaptively compensate for periodic desynchronization by pre-packing additional subblocks of the input matrices A and B for future iterations. Moreover, the lookahead depth may be actively constrained by the amount of desynchronization. In accordance with example implementations, the number of threads cooperatively packing a shared block of either matrix A or B may be adjusted by means of a fair sharing principle to help improve group synchronization.

Figure 9:
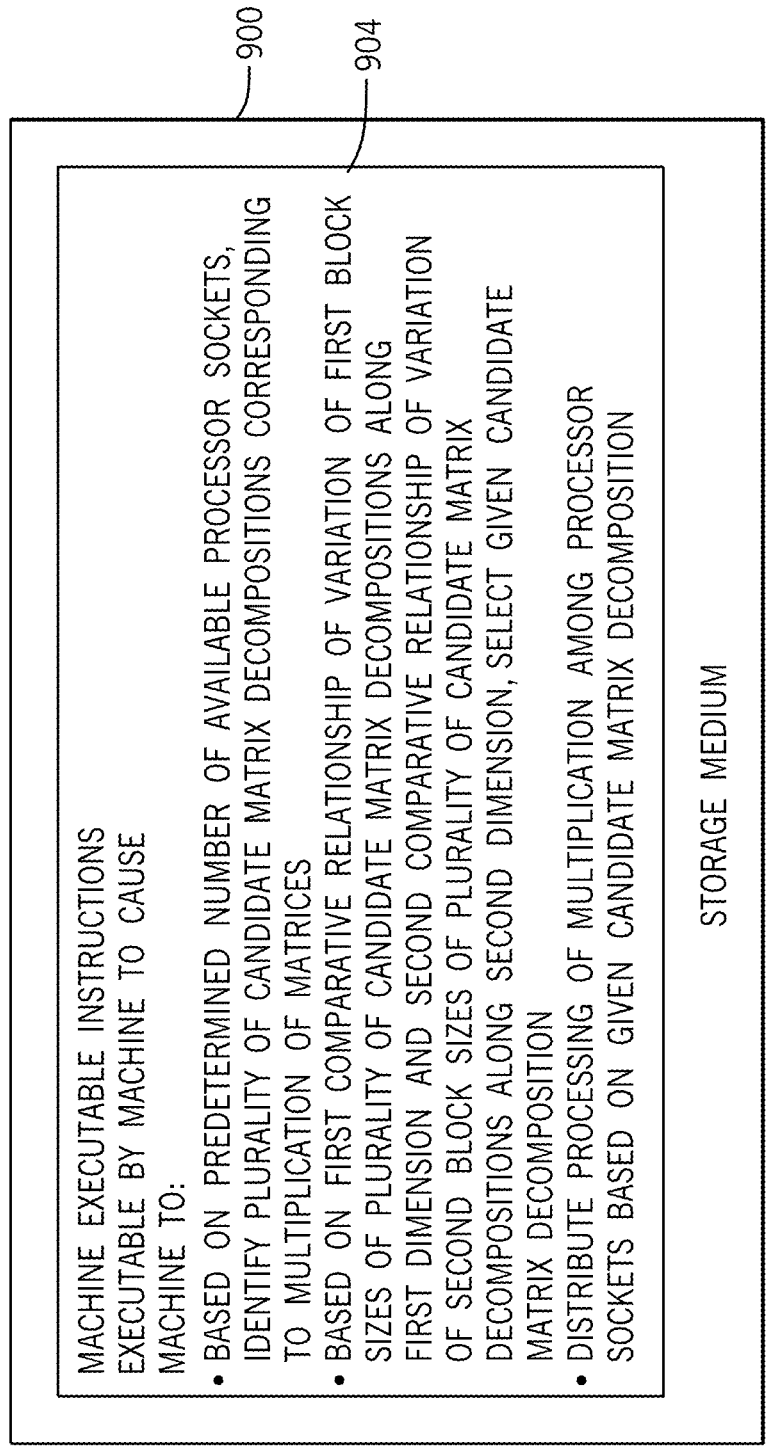
FIG. 9 is an illustration of machine executable instructions that are stored on a storage medium and executable by a machine to cause the machine to distribute processing of a multiplication of matrices among processor sockets according to an example implementation.

Referring to FIG. 9, in accordance with example implementations, a non-transitory storage medium 900 includes machine executable instructions 904 that are executable by a machine to cause the machine to, based on a predetermined number of available processor sockets, identify a plurality of candidate matrix decompositions corresponding to a multiplication of matrices. The instructions 904, when executed by the machine, further cause the machine to, based on a first comparative relationship of a variation of first block sizes of the plurality of candidate matrix decompositions along a first dimension and a second comparative relationship of a variation of second block sizes of the plurality of candidate matrix decompositions along a second dimension, select a given candidate matrix decomposition. The instructions 904, when executed by the machine, further cause the machine to distribute processing of the multiplication among the processor socket space based on the given candidate matrix decomposition.

Figure 10:
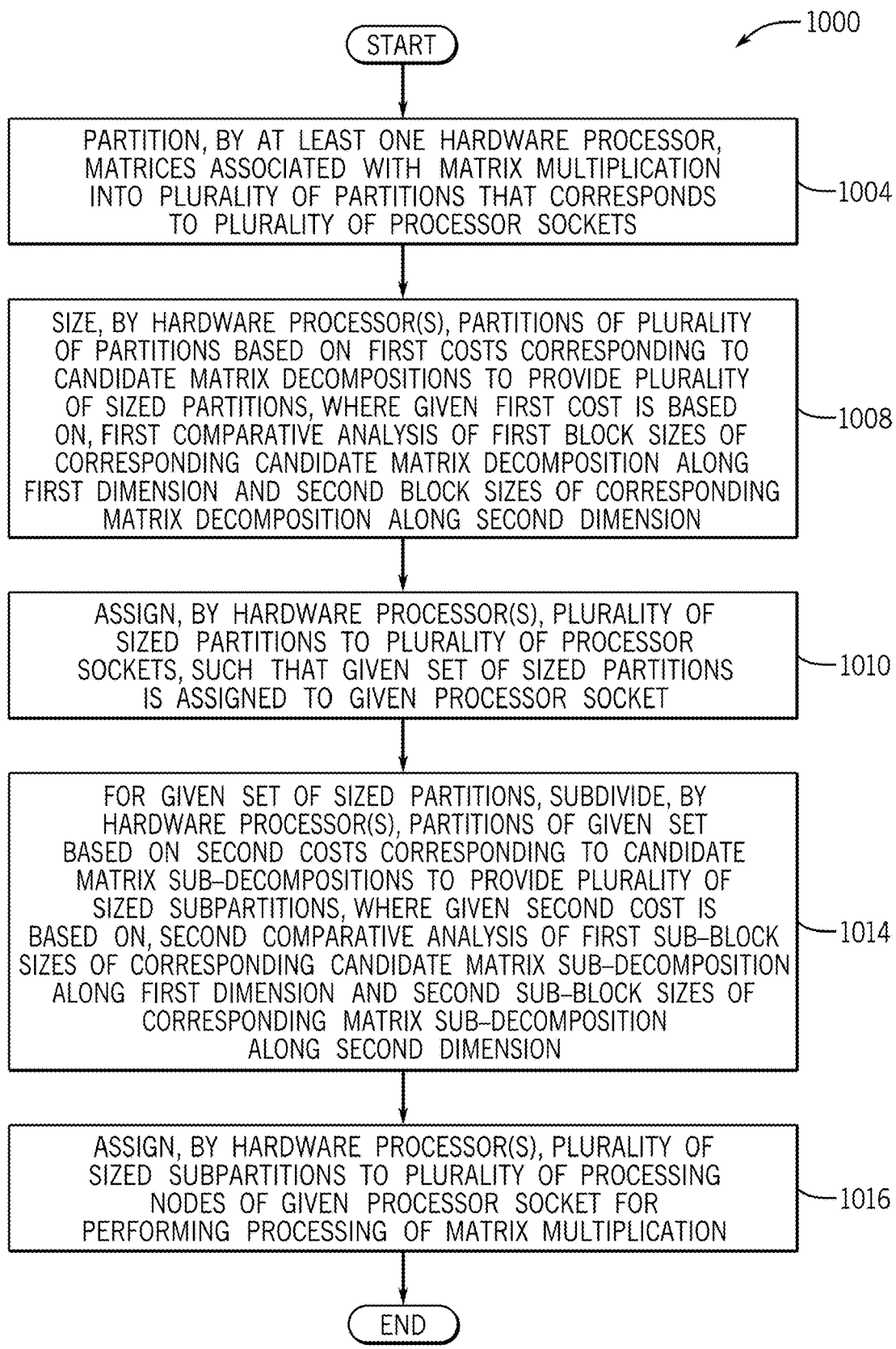
FIG. 10 is a flow diagram depicting a process to distribute the processing of a matrix multiplication among processor sockets and processing nodes according to an example implementation.

Referring to FIG. 10, in accordance with example implementations, a process 1000 includes partitioning (block 1004), by at least one hardware processor, matrices that are associated with a matrix multiplication into a plurality of partitions that correspond to a plurality of processor sockets. Pursuant to block 1008, the process 1000 includes sizing, by the hardware processor(s), the partitions based on first costs corresponding to candidate matrix decompositions to provide a plurality of sized partitions. A given first cost is based on a first comparative analysis of first block sizes of the corresponding candidate matrix decomposition along a first dimension and second block sizes of the corresponding candidate matrix decomposition along a second dimension. The process 1000 includes assigning (block 1010), by the hardware processor(s) the plurality of sized partitions to the plurality of processor sockets, such that a given set of sized partitions is assigned to a given processor socket. Pursuant to block 1014, for the given set of sized partitions, the process 1000 includes subdividing, by the hardware processor(s) the partitions of the given set based on second costs corresponding to candidate matrix sub-decompositions to provide a plurality of sized subpartitions. A given second cost is based on a second comparative analysis of first sub-block sizes of the corresponding candidate matrix sub-decomposition along the first dimension and second sub-block sizes of the corresponding candidate matrix sub-decomposition along the second dimension. The process 1000 includes assigning (block 1016) by the hardware processor(s), the plurality of sized subpartitions to a plurality of processing nodes of the given processor socket for performing processing of the multiplication.

Figure 11:
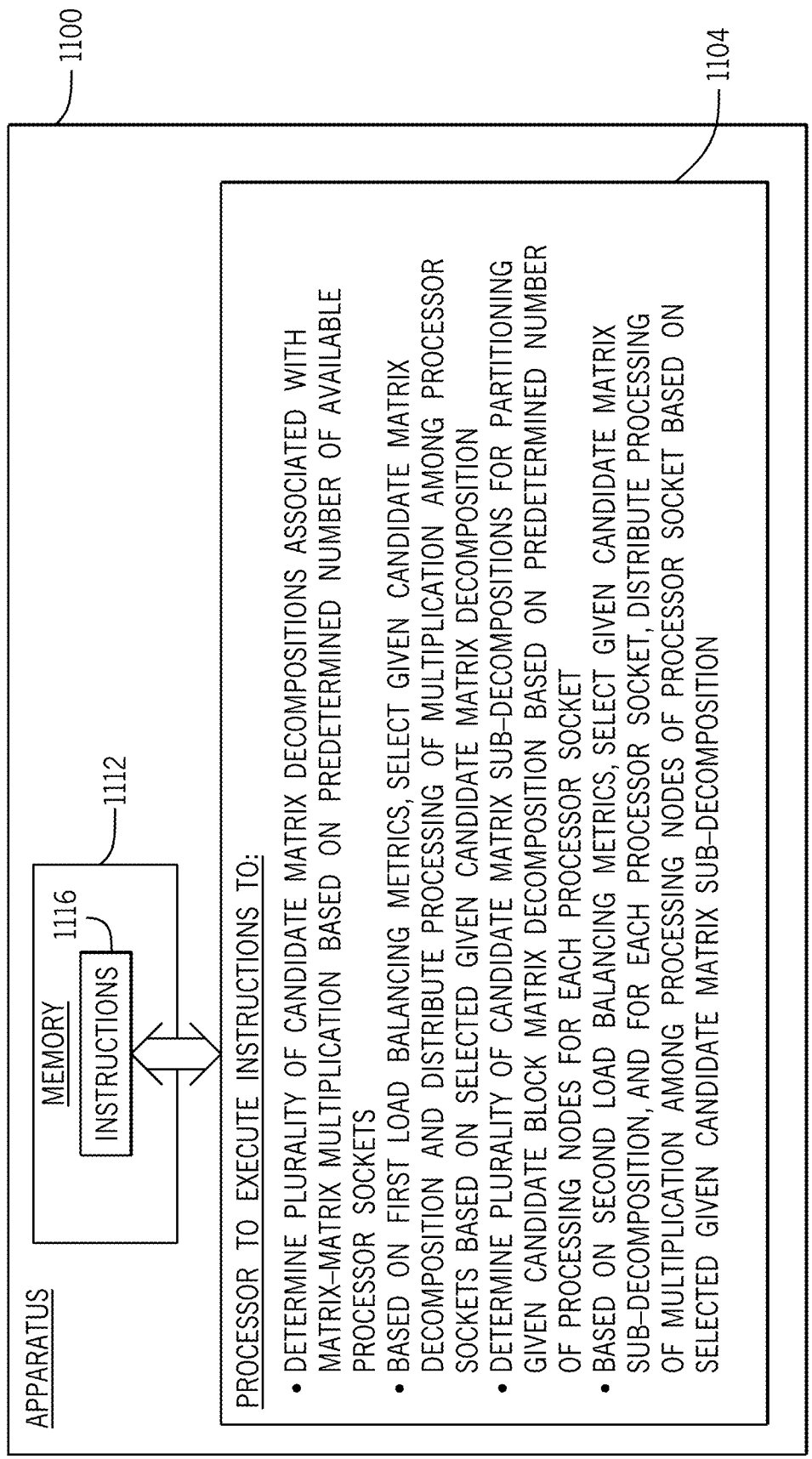
FIG. 11 is a schematic diagram of an apparatus to assign processor sockets and processing nodes to the processing of a matrix-matrix multiplication according to an example implementation.

Referring to FIG. 11, in accordance with example implementations, an apparatus 1100 includes a memory 1112 that stores instructions 1116 and a processor 1104. The processor 1104 is to execute the instructions 1116 to cause the processor to determine a plurality of candidate matrix decompositions associated with a matrix-matrix multiplication based on a predetermined number of available processor sockets; and based on first load balancing metrics, select a given candidate matrix decomposition of a plurality of candidate matrix decompositions and distribute processing of the multiplication among the processor sockets based on the selected given candidate matrix decomposition. The instructions 1116, when executed by the processor 1104, further cause the processor 1104 to determine a plurality of candidate matrix sub-decompositions for partitioning the given candidate matrix block decomposition based on a predetermined number of processing nodes for each processor socket; and based on second load balancing metrics, select a given candidate matrix sub-decomposition, and for each processor socket, distribute processing of the multiplication among the processing nodes of the processor socket based on the selected given candidate matrix sub-decomposition.

In accordance with some implementations, a plurality of sub-decompositions of the given candidate decomposition are identified based on a predetermined number of processing nodes per socket. Based on a third comparative relationship of a variation of third sizes of the plurality of matrix sub-decompositions along the first dimension and a second comparative relationship of a variation of fourth sizes of the plurality of candidate matrix sub-decompositions along the second dimension, select a given candidate matrix sub-decomposition. Processing of the matrix-matrix multiplication may be distributed among the processing nodes based on the given candidate matrix sub-decomposition. Among the potential advantages, matrix processing workload may be efficiently distributed among the processing nodes.

In accordance with example implementations, the processing nodes may include non-uniform memory access (NUMA) nodes. A particular advantage is that the workload distribution may take advantage of a NUMA architecture.

In accordance with example implementations, node masks may be determined for memory buffers that are shared by the processing nodes. A particular advantage is that due to partitioning, data corresponding to matrix partitions may be assigned to specific processing nodes.

In accordance with example implementations, a plurality of candidate processing thread-to-processing core assignments may be identified; and based on at least one of a cache block size and a processor core per last level cache number, a given candidate processing thread-to-processing core assignment may be selected. Processing of the multiplication may be distributed among a plurality of processing threads of each processing node based on the given candidate processing thread-to-processing core assignment. A particular advantage is that the processing workload may be efficiently distributed to processing threads.

In accordance with example implementations, the first comparative relationship may include a first difference between a maximum of the first sizes and a minimum of the first sizes. A cost may be determined based on the first difference, and the given candidate matrix decomposition may be selected based on the costs. A particular advantage is that a matrix multiplication workload may be efficiently distributed among processor sockets.

In accordance with example implementations, the second comparative relationship includes a second difference between a maximum of the second sizes and a minimum of the second sizes. A cost based on the first difference and the second difference may be determined. A particular advantage is that a matrix multiplication workload may be efficiently distributed among processor sockets.

In accordance with example implementations, the first comparative relationship includes a first ratio between a maximum of the first sizes and a minimum of the first sizes. A cost may be determined based on the first ratio, and the given candidate matrix decomposition may be selected based on the cost. A particular advantage is that a matrix multiplication workload may be efficiently distributed among processor sockets.

In accordance with example implementations, the second comparative relationship may include a second ratio between a maximum of the second sizes and a minimum of the second sizes. The cost may be determined based on the first ratio and the second ratio. A particular advantage is that a matrix multiplication workload may be efficiently distributed among processor sockets.

In accordance with example implementations, a cost may be determined based on the first comparative relationship, the second comparative relationship and a condition to bias the cost to select a first candidate matrix decomposition, which is relatively more column centric than a second candidate matrix decomposition. The given candidate matrix decomposition may then be selected based on the cost. A particular advantage is that a matrix multiplication workload may be efficiently distributed among processor sockets.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
    partitioning, by at least one hardware processor, matrices associated with a matrix multiplication into a plurality of partitions that corresponds to a plurality of processor sockets;
    sizing, by the at least one hardware processor, the plurality of partitions based on first costs corresponding to candidate matrix decompositions to provide a plurality of sized partitions, wherein a given first cost of the first costs is based on a first comparative analysis of first block sizes of the corresponding candidate matrix decomposition along a first dimension and second block sizes of the corresponding candidate matrix decomposition along a second dimension;
    assigning, by the at least one hardware processor, the plurality of sized partitions to the plurality of processor sockets, in a manner that a given set of sized partitions of the plurality of sized partitions is assigned to a given processor socket of the plurality of processor sockets;
    for the given set of sized partitions, subdividing, by the at least one hardware processor, the partitions of the given set based on second costs corresponding to candidate matrix sub-decompositions to provide a plurality of sized sub-partitions, wherein a given second cost of the second costs is based on a second comparative analysis of first sub-block sizes of the corresponding candidate matrix sub-decomposition along the first dimension and second sub-block sizes of the corresponding candidate matrix sub-decomposition along the second dimension; and
    assigning, by the at least one hardware processor, the plurality of sized sub-partitions to a plurality of processing nodes of the given processor socket for performing processing of the multiplication.

2. The method of claim 1, further comprising:
    based on a processing core per processing node number, identifying a plurality of candidate processing thread-to-processing core assignments;
    based on at least one of a cache block size and a processor core per last level cache number, selecting a given candidate processing thread-to-processing core assignment of the plurality of candidate processing thread-to-processing core assignments; and
    assign threads to each processing node of the plurality of processing nodes based on the given candidate processing thread-to-processing core assignment.

3. The method of claim 2, further comprising processing the multiplication using a generalized matrix multiplication algorithm based on the assigned plurality of sized partitions, the plurality of sized sub-partitions and the assigned threads.

4. The method of claim 3, wherein processing the multiplication using the generalized matrix multiplication algorithm comprises using synchronization barriers in the threads.

5. The method of claim 3, wherein processing the multiplication using the generalized matrix multiplication algorithm comprises using node masks for memory buffers shared by the plurality of processing nodes.

6. A non-transitory storage medium that stores machine-readable instructions that, when executed by a hardware processor, cause the processor to:
    partition matrices associated with a matrix multiplication into a plurality of partitions that corresponds to a plurality of processor sockets;
    size the plurality of partitions based on first costs corresponding to candidate matrix decompositions to provide a plurality of sized partitions, wherein a given first cost of the first costs is based on a first comparative analysis of first block sizes of the corresponding candidate matrix decomposition along a first dimension and second block sizes of the corresponding candidate matrix decomposition along a second dimension;
    assign the plurality of sized partitions to the plurality of processor sockets in a manner that a given set of sized partitions of the plurality of sized partitions is assigned to a given processor socket of the plurality of processor sockets;
    for the given set of sized partitions, subdivide the partitions of the given set based on second costs corresponding to candidate matrix sub-decompositions to provide a plurality of sized sub-partitions, wherein a given second cost of the second costs is based on a second comparative analysis of first sub-block sizes of the corresponding candidate matrix sub-decomposition along the first dimension and second sub-block sizes of the corresponding candidate matrix sub-decomposition along the second dimension; and assign the plurality of sized sub-partitions to a plurality of processing nodes of the given processor socket for performing processing of the multiplication.

7. The non-transitory storage medium of claim 6, wherein the instructions, when executed by the hardware processor, further cause the hardware processor to:

based on a processing core per processing node number, identify a plurality of candidate processing thread-to-processing core assignments;

based on at least one of a cache block size and a processor core per last level cache number, select a given candidate processing thread-to-processing core assignment of the plurality of candidate processing thread-to-processing core assignments; and assign threads to each processing node of the plurality of processing nodes based on the given candidate processing thread-to-processing core assignment.

8. The non-transitory storage medium of claim 7, wherein the instructions, when executed by the hardware processor, further cause the hardware processor to:

process the multiplication using a generalized matrix multiplication algorithm based on the assigned plurality of sized partitions, the plurality of sized sub-partitions and the assigned threads.

9. The non-transitory storage medium of claim 8, wherein processing the multiplication using the generalized matrix multiplication algorithm comprises using synchronization barriers in the threads.

10. The non-transitory storage medium of claim 8, wherein processing the multiplication using the generalized matrix multiplication algorithm comprises using node masks for memory buffers shared by the plurality of processing nodes.

11. An apparatus comprising:
at least one hardware processor; and
a memory to store instructions that, when executed by the at least one hardware processor, cause the at least one hardware processor to:
partition matrices associated with a matrix multiplication into a plurality of partitions that corresponds to a plurality of processor sockets;
size the plurality of partitions based on first costs corresponding to candidate matrix decompositions to provide a plurality of sized partitions, wherein a given first cost of the first costs is based on a first comparative analysis of first block sizes of the corresponding candidate matrix decomposition along a first dimension and second block sizes of the corresponding candidate matrix decomposition along a second dimension;
assign the plurality of sized partitions to the plurality of processor sockets in a manner that a given set of sized partitions of the plurality of sized partitions is assigned to a given processor socket of the plurality of processor sockets;
for the given set of sized partitions, subdivide the partitions of the given set based on second costs corresponding to candidate matrix sub-decompositions to provide a plurality of sized sub-partitions, wherein a given second cost of the second costs is based on a second comparative analysis of first sub-block sizes of the corresponding candidate matrix sub-decomposition along the first dimension and second sub-block sizes of the corresponding candidate matrix sub-decomposition along the second dimension; and
assign the plurality of sized sub-partitions to a plurality of processing nodes of the given processor socket for performing processing of the multiplication.

12. The apparatus of claim 11, wherein the instructions, when executed by the at least one hardware processor, further cause the at least one hardware processor to:

based on a processing core per processing node number, identify a plurality of candidate processing thread-to-processing core assignments;

based on at least one of a cache block size and a processor core per last level cache number, select a given candidate processing thread-to-processing core assignment of the plurality of candidate processing thread-to-processing core assignments; and assign threads to each processing node of the plurality of processing nodes based on the given candidate processing thread-to-processing core assignment.

13. The apparatus of claim 12, wherein the instructions, when executed by the at least one hardware processor, further cause the at least one hardware processor to:

process the multiplication using a generalized matrix multiplication algorithm based on the assigned plurality of sized partitions, the plurality of sized sub-partitions and the assigned threads.

14. The apparatus of claim 13, wherein processing the multiplication using the generalized matrix multiplication algorithm comprises using synchronization barriers in the threads.

15. The apparatus of claim 13, wherein processing the multiplication using the generalized matrix multiplication algorithm comprises using node masks for memory buffers shared by the plurality of processing nodes.

* * * * *